United States Patent [19]

Noodleman

[11] 3,876,892
[45] Apr. 8, 1975

[54] COMMUTATING STRUCTURE FOR DC PERMANENT MAGNET MACHINES

[75] Inventor: Samuel Noodleman, Blacksburg, Va.

[73] Assignee: Kollmorgen Corporation, Hartford, Conn.

[22] Filed: May 20, 1974

[21] Appl. No.: 471,313

Related U.S. Application Data

[63] Continuation-in-part of Ser. No. 383,883, July 30, 1973, Pat. No. 3,817,964.

[52] U.S. Cl. .................. 310/46; 310/219; 310/128
[51] Int. Cl. ........................................... H02k 13/00
[58] Field of Search...... 310/40 R, 40 MM, 46, 152, 310/156, 219, 231, 238, 248, 128

[56] References Cited
UNITED STATES PATENTS

| | | | |
|---|---|---|---|
| 388,513 | 8/1888 | Van Gestel | 310/219 |
| 399,329 | 3/1889 | Heywood | 310/219 |
| 1,375,161 | 4/1921 | Landers | 310/219 |
| 2,194,211 | 3/1940 | Sansom | 310/46 X |
| 2,409,600 | 10/1949 | Trautschold | 310/219 |
| 2,467,758 | 4/1949 | Lindenblad | 310/219 X |
| 3,341,726 | 9/1967 | Brinster et al. | 310/219 X |
| 3,396,296 | 8/1968 | Esters | 310/46 X |
| 3,534,203 | 10/1970 | Sommeria | 310/46 X |
| 3,544,868 | 12/1970 | Bates | 310/231 X |
| 3,603,823 | 9/1971 | Mason | 310/46 |
| 3,819,964 | 6/1974 | Noodleman | 310/46 |

FOREIGN PATENTS OR APPLICATIONS

| | | | |
|---|---|---|---|
| 1,065,579 | 5/1954 | France | 310/219 |

*Primary Examiner*—Donovan F. Duggan
*Attorney, Agent, or Firm*—Morgan, Finnegan, Durham & Pine

[57] ABSTRACT

A DC permanent magnet machine in which the functions typically attributed to the stator and rotor assemblies are reversed to provide an "inside out" design. The stator is provided with a plurality of electrically energizable poles having windings which are electrically coupled to associated commutator bars forming an annular array. Also associated with the stator are a pair of annular conductive rings. The rotor is provided with a plurality of permanent magnet poles equal in number to the poles provided in the stator. The rotor also carries a plurality of roller contacts which serve to couple the commutator bars to the conductive rings which are, in turn, connected to opposite polarities of the DC energizing source, thereby providing electrical power to associated coils of the stator winding.

6 Claims, 7 Drawing Figures

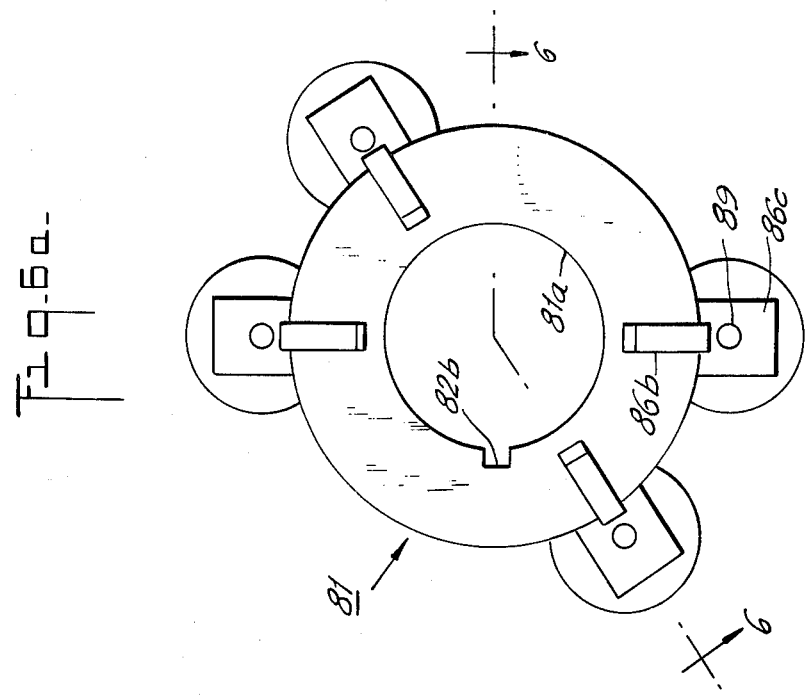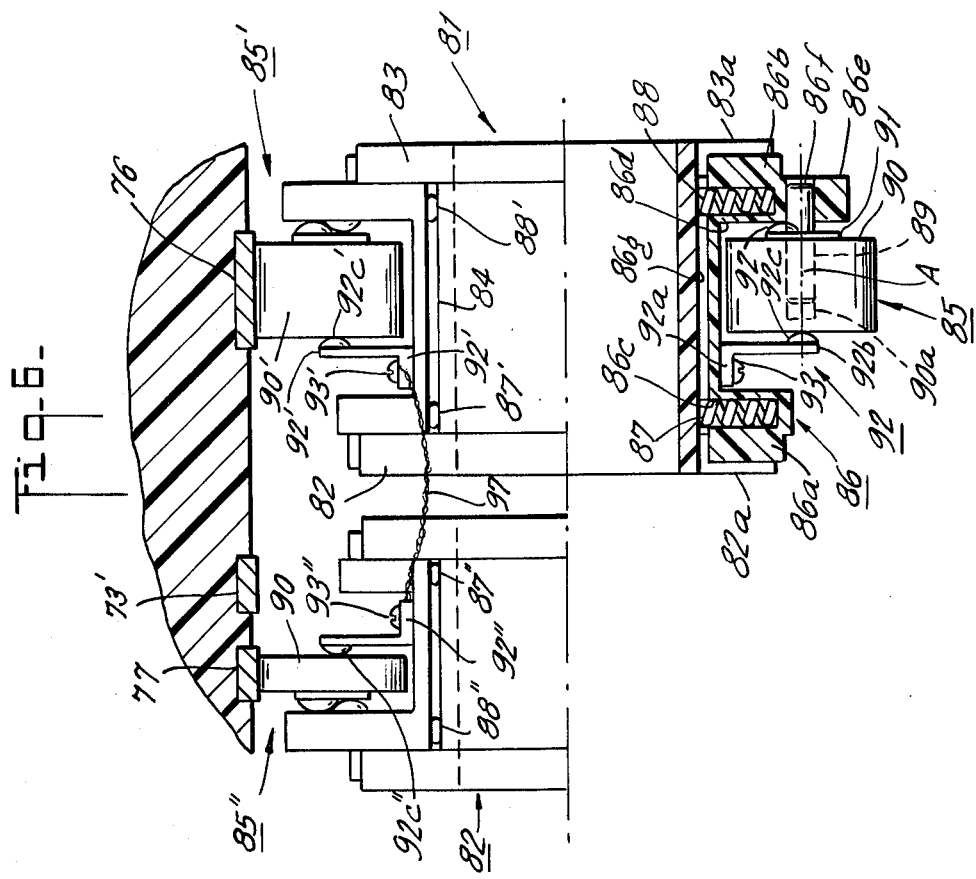

3,876,892

COMMUTATING STRUCTURE FOR DC PERMANENT MAGNET MACHINES

This application is a continuation-in-part of application Ser. No. 383,883 filed July 30, 1973, now U.S. Pat. No. 3,819,964.

BACKGROUND OF THE INVENTION

DC motors of conventional design typically utilize a multi-pole permanent magnet stator and a rotor having a plurality of energizable conductors arranged about the surface thereof and parallel to the axis of rotation. Pairs of said conductors are electrically energized by rotating commutator bars provided on the rotor, which commutator bars are electrically energized by a DC source through stationary commutator brushes which make wiping engagement with the commutator bar array. Interaction of the stator permanent magnet fields with the magnetic fields created by DC energization of the rotor conductors provides for rotation of the rotor, whereby relative rotation of the commutator bars and commutator brushes continuously changes the electrical connections between the DC source and the array of conductors in the rotor. Significant wearing of the commutator bars is caused both by the sliding friction of the brushes and the burning action of the commutating current, thereby reducing the useful operating life of the motor.

The above disadvantages, as well as the fact that conventional DC motors have high inertia, has led to the development of the "inside out" motor design in which the multi-pole rotor is provided with permanent magnet members and the stator is provided with an equal number of poles whose windings are energized by the DC source. This design provides a rotor with lower inertia for a given peak torque, and a stator having greater copper volume and better heat dissipation as compared with conventional DC motor designs. Thus, the "inside out" motor design has a higher continuous rating in contrast to conventional DC motors of the same size and weight.

The problems of commutation in motors of the "inside out" type has led to the development of a DC brushless type motor which employs electronic amplifiers and other solid state circuit elements to provide the necessary commutation. The electronic amplifiers and circuit elements required for proper switching of power to the stator windings to generate the rotating field add significant cost and weight to the motor. The solid state switching circuitry also increases motor "cogging" which occurs during low speed motor operation.

The numerous problems and disadvantages encountered in DC motors of both the conventional and "inside out" design has led to the development of the design described in the aforementioned copending application which is characterized by providing novel electro-mechanical switching techniques for commutating the motor windings.

In a preferred embodiment of the invention disclosed in the above-mentioned copending application, the stator assembly is provided with first and second annular conductive rings connected to opposite polarities of a DC source and an annular array of commutator bars disposed proximate thereto. The rotor assembly is provided with a plurality of roller contacts which revolve with the rotation of the rotor shaft to simultaneously couple the opposite terminals of the stator coils to the opposite polarities of the DC source so as to progressively energize stator coils, the magnetic fields of which interact with the rotating magnetic fields of the rotor permanent magnets to effect rotor rotation.

Thus, conventional commutation, in which brush and commutator wear is caused both by sliding friction and the burning action of commutating current, is replaced by the rolling contact between the conductive rings and the commutator bars. This novel commutation technique permits the motor components to be designed for optimum commutation, minimum wear and smooth operation.

The aforeside unique commutation method is, of course, also adaptable for use in conventional DC motor design wherein the annular arrays of commutator bars and conductive rings are incorporated in the rotor design and the roller contacts form part of the stator.

The commutating technique of the above design exemplified by copending application Ser. No. 383,883 employs a "rigid" roller concept in which the rollers contacting their associated slip rings and the rollers on the commutator are mechanically as well as electrically tied together so that current brought in through the slip ring roller is fed directly into the commutator roller. Whereas this approach provides minimum contact drop, it also requires that the associated rollers be operating at the same speed. Consequently, any factors which result in the production of differing roller or ring diameters or any other condition which would cause one of the rollers to operate at a different speed would impose upon its associated roller the requirement that it must slip with respect to the other. Also, if after long, continued use, one of the rollers wears at a rate different from its associated roller causing its diameter to change, slippage will occur. It has also been found that a structure mechanically tying two rollers together introduces dynamic instability in that the moment of inertia of the roller assembly about an axis at right angles to the axis of rotation is quite high and any bounce or eccentricity is greatly magnified at high rotating speeds which can cause the rollers to pull away from the contacting surfaces.

BRIEF DESCRIPTION OF THE INVENTION

A novel roller design for use with the above-described commutating structure has now been developed whereby each roller is spring loaded against its mating surface and therefore can operate independently of the other. Both of the associated rollers and the contact spring arrangements which conduct current therebetween are mounted upon separate and independent spring biased assemblies which include a "split" spring contact arrangement with separate halves of the spring contact arrangement mounted upon each slider.

The present invention provides a novel contact arrangement for use in DC permanent magnet machines and the like, especially of the "inside out" design, wherein each roller assembly utilizes independently mounted spring biased roller contacts which, while being electrically connected to one another, are independently movable so as to enhance dynamic stability of the switching assembly and so as to permit independent operation of each roller.

BRIEF DESCRIPTION OF THE DRAWINGS

The invention is set forth in greater detail in the specification of which the following drawings form a part:

FIG. 6 is a side view of one preferred embodiment of the roller contact assembly shown in FIG. 1 and incorporating the principles of the present invention; and FIG. 6a shows an end view of the embodiment of FIG. 6.

DETAILED DESCRIPTION

Figure 1:
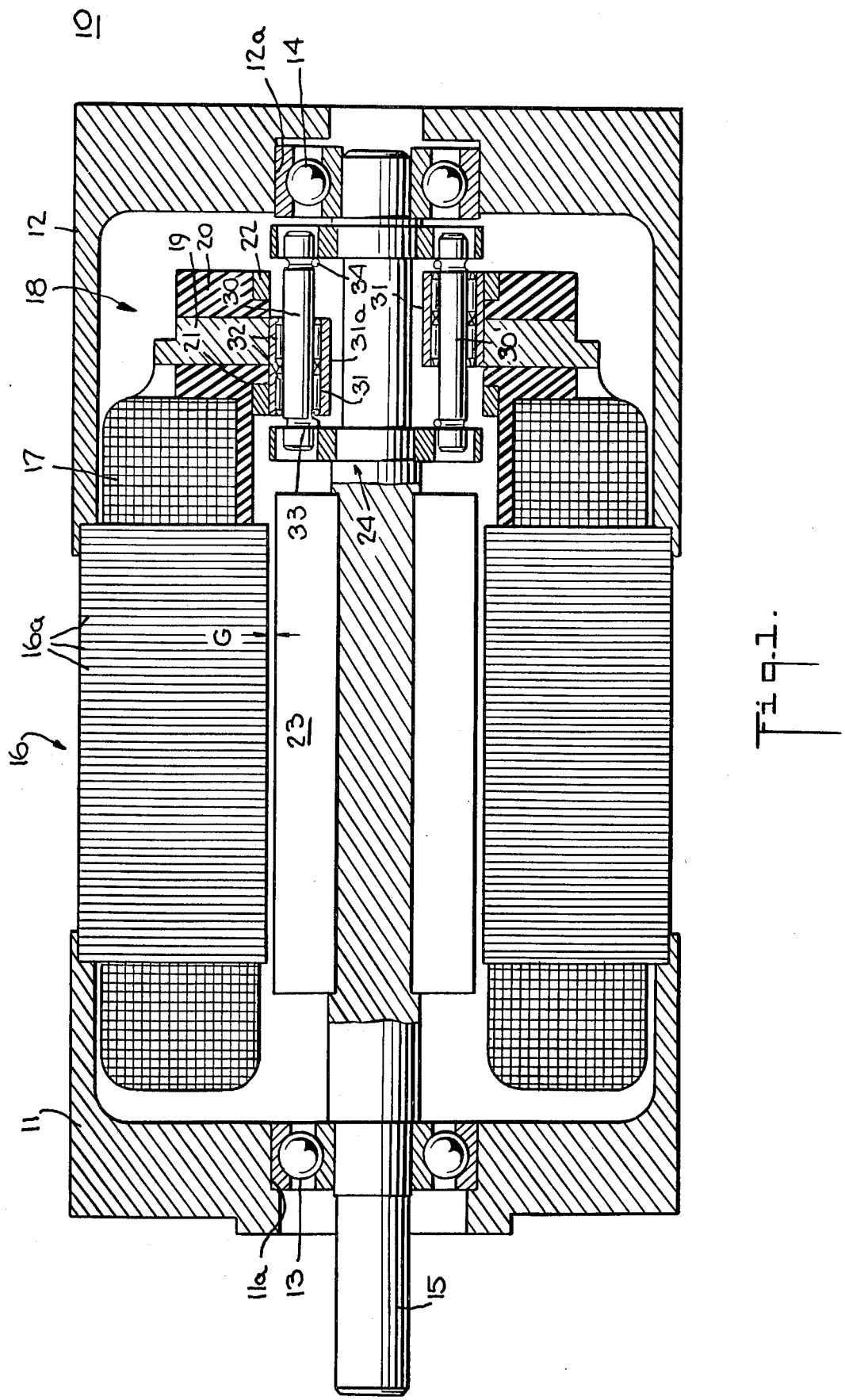
FIG. 1 is a sectional view of a preferred embodiment of the invention.

FIG. 1 shows a preferred embodiment 10 of the invention which is comprised of housing members 11 and 12 which are each provided with openings 11a and 12a for receiving bearing 13 and 14 which surround a rotatably mounted rotor shaft 15. The inner ends of housing members 11 and 12 are hollow and are contoured or otherwise formed to receive and support the stator and rotor assemblies.

The stator assembly is comprised of a laminated core 16 formed of individual laminations 16a. The stator winding is comprised of a plurality of coils 17 (not shown in detail for purposes of simplicity) which, when energized, create magnetic fields in the stator core which interact with the magnetic fields set up in the rotor assembly to effect rotor rotation.

Figures 2, 3:
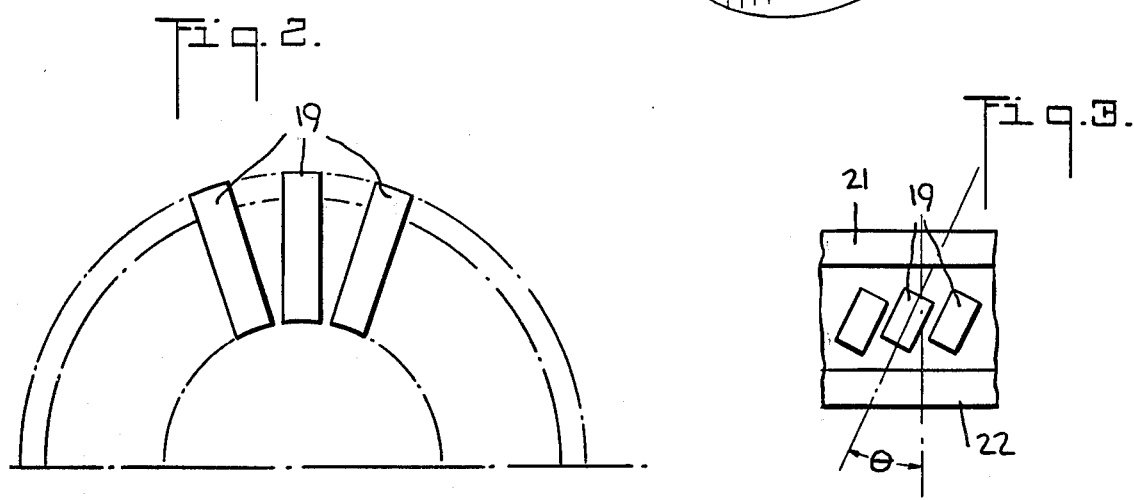
FIG. 2 is a partial sectional view of the commutator bar array of FIG. 1.
FIG. 3 is an interior radial view of the commutator bar array of FIG. 1.

Housing member 12 is further adapted to receive the commutator assembly 18 which includes a plurality of commutator bars 19 mounted in radial fashion (see FIG. 2) within an annular-shaped insulating member 20. Selected ones of the commutator bars are electrically connected to the remaining terminal of associated stator coils. As shown in FIG. 3, the commutator bars 19 are aligned at a small angle $\theta$ with respect to each other so that a roller contact moving left to right with respect to FIG. 3 will effect a make-before-break contact with the commutator bars. In addition, skewing the commutator bars provides a smooth rolling surface for the roller contact so that it will mate smoothly with the inside surface of the commutator.

A pair of conductive rings 21 and 22 are mounted within grooves provided in annular-shaped insulating member 20 and positioned on opposite sides of the commutator bar array. Conductive rings 21 and 22 are respectively connected to the plus and minus terminals of the DC source (not shown). While shown in FIG. 1 as disposed on opposite sides of the commutator bar array 19, both conductive rings 21 and 22 may be positioned on the same side of the commutator bar array if desired.

The rotor assembly comprises a permanent magnet array 23 secured to shaft 15. The outer periphery of the permanent magnet array lies a small, spaced distance from the interior periphery of the stator core 16 to form a hollow, annular-shaped gap G therebetween.

Figure 4:
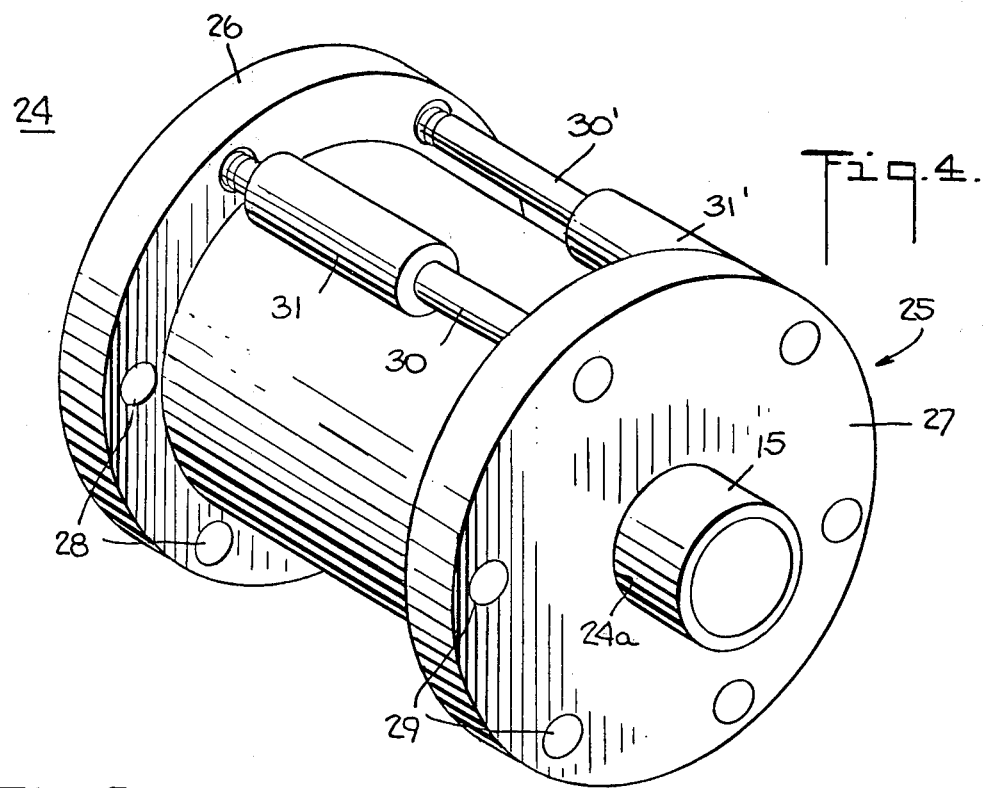
FIG. 4 is a perspective view of the roller contact assembly of FIG. 1.

Referring now to FIG. 4, there is shown a roller contact assembly 24 comprising a cylindrical drum 25 secured to shaft 15 by means of a central opening 24a. The ends of drum 25 are provided with integral, formed annular flanges 26 and 27 each having an array of spaced openings 28 and 29. The openings of the array in flange 26 are opposite the associated openings of the array in flange 27 and are adapted to receive a shaft 30 which is secured therein so as to experience no rotation about its longitudinal axis.

Referring once again to FIG. 1, a roller contact 31 is rotatably mounted upon shaft 30 by bearings 32. Roller contact 31 is preferably formed of a suitable contact material such as electrographitic carbon, carbon graphite, silver graphite, silver cadmium oxide or silver tungsten. While roller contact 31 is free to rotate about shaft 30, bearing 32 has its inner face secured to shaft 30 to prevent contact 31 from moving linearly along shaft 30.

Roller contact 31 is positioned along shaft 30 so as to make continuous rolling engagement with conductive ring 21 and sequential and progressive engagement with the radial array of commutator bars 19.

A second roller contact 31' is associated with roller contact 31 and is positioned a spaced angular distance around drum 25. Roller contact 31' is rotatably mounted to a shaft 30' by bearings similar to bearings 32. Roller contact 31' in addition to being angularly displaced from roller contact 31, is linearly displaced relative to roller contact 31 so as to make continuous rolling contact with conductive ring 22 as well as to make sequential and progressive rolling engagement with commutator bars 19.

The angular displacement between roller contacts 31 and 31' is such that the roller contacts will simultaneously engage a pair of displaced commutator bars which are connected to the end terminals of a common stator coil to couple opposite polatiries of the energizing source thereto. Although not shown for purposes of simplicity a number of pairs of roller contacts are arranged around drum 25 for electrically energizing a like number of coils to develop magnetic fields in the stator which interact with the rotating magnetic fields of the rotor permanent magnets to sustain rotation of the rotor shaft.

Shaft 30 is biased at each end by springs 33 and 34 to urge roller contact 31 into firm electrical engagement with the associated conductive ring and commutator bars. As the angular velocity of the rotor shaft increases, the centrifugal force created serves to assist springs 33 and 34 in providing good electrical contact.

Figure 5:
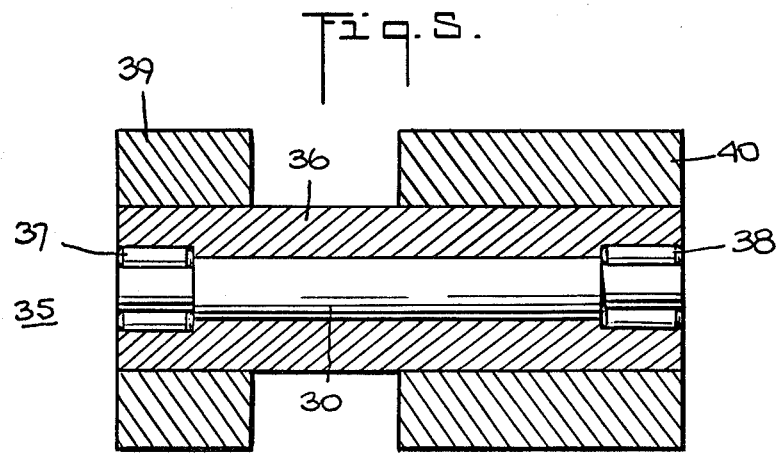
FIG. 5 is a sectional view of a roller contact which may be used with the embodiment of FIG. 1.

FIG. 5 shows an alternative roller contact assembly 35 for use with the embodiment of FIG. 1 comprising a tubular conductive member 36 rotatably mounted to shaft 30 by bearings 37 and 38 which are secured within grooves provided in conductive member 36 and shaft 30.

A first, shorter sleeve 39 is secured to conductive member 36 and is positioned to make contact with one of the conductive rings 21 and 22. Sleeve 39 may preferably be formed of a suitable contact material such as electrographitic carbon or silver graphite. A second longer sleeve 40 is secured to member 36 a spaced distance from sleeve 39 and makes contact with the commutator bars 19. Sleeve 40 is also preferably formed of a suitable contact material such as electrographitic carbon or silver graphite. The use of two separate sleeves enables selection of materials which are best suited for the particular application.

In operation, the current in the sleeve engaging conductive ring 21 (or 22) passes through conducting member 36 and sleeve 40 so as to be selectively and progressively transferred to the commutator bars 19.

It is generally accepted that energizing windings utilizing the DC brushless concept requires relatively large numbers of solid state components in an electronic control circuit in order to develop the effect of the large number of commutator bar segments which are necessary for smooth operation at slow speeds. In view of the foregoing, another application of the present invention is to use the commutation techniques described herein to effect a smooth DC brushless motor operation at slow speeds and then switch to a static control incorporating a smaller number of solid state circuit elements to energize the windings during high speed operation. Such an arrangement would serve to provide a smooth operating motor at slow speeds and to provide the long life operation of the DC brushless control circuit for high speed conditions.

As can best be seen from a consideration of FIGS. 1 and 4 the roller contact 31 mounted upon shaft 30 has a length sufficient to enable the roller contact to simultaneously engage conductive ring 21 and the surfaces of commutator bars 19 (see FIGS. 2 and 3). If there be any unevenness in the wearing of the surface portion of the roller 31 which engages the conductive ring 21 relative to the wearing of the portion of roller contact surface 31 which engages the commutator bars 19, slippage will occur or, alternatively, the faster wearing surface will not make sufficient contact with its engaging contact surface. In the embodiment shown in FIG. 5, where separate roller portions 39 and 40 are mounted upon a hollow cylindrical member 36, uneven wearing of the surfaces of the members 39 and 40 will create similar problems.

In order to overcome these remaining difficulties the switching assembly of FIGS. 6-6a has been developed. As shown therein, separate roller assemblies are utilized so that the entire assembly is free to maintain roller contact against the commutator bars and conductive rings.

As shown in FIG. 6a, first and second drums 81 and 82 are provided. Each of these drums is provided with a central opening such as, for example, central opening 81a, which opening is used for mounting the drum assembly upon rotor shaft 15. Considering FIG. 6, drum 81 is provided with continuous, annular flanges 82 and 83 spaced apart by a cylindrical surface 84 of reduced diameter. Flanges 82 and 83 are each provided with rectangular shaped slots 82a and 83a for slidably receiving end portions 86a and 86b of a slider member 86 which is slidably mounted within the aforementioned rectangular shaped slots. Slider 86 is further provided with first and second circular-shaped bores 86c and 86d for receiving helical springs 87 and 88, respectively, which are positioned between the bases of bores 86c and 86d and the surface 84 of drum 81. An outwardly extending rectangular shaped portion 86e of slider 86 is provided with an opening 86f for force fitted pin 89 which extends toward the left as shown in FIG. 6 to be inserted into an opening 90a in conducting roller 90. A washer and leaf spring 91, having a serpentine configuration, are positioned between the projection 86e of slider 86 and the right-hand surface of roller 90.

An L-shaped contact spring 92 has one arm 92a secured to the base 86g of slider member 86 by fastener 93. Arm 92b is provided with a contact button 92c which bears against the lefthand surface of conducting roller 90. Contact button 92c engages the surface of conducting roller 90 at a point which is coincident with both the longitudinal axis of pin 89 and the rotating axis of conducting roller 90. Roller assembly 85', shown in the upper portion of FIG. 6 is substantially identical to roller assembly 85 and cooperates with another roller assembly 85'' mounted upon drum 82 and substantially identical in design to roller assemblies 85 and 85' except that conducting roller 90'' is shorter in axial length than rollers 90 and 90'. The fastening members 93' and 93'', in addition to serving as a means for securing contact springs 92' and 92'' to drums 81 and 82, further serve as a means for securing the respective ends of a conductive lead 97.

Considering roller assemblies 85' and 85'', conducting roller 90 progressively rollingly engages the commutator bars 76 while conducting roller 90'' rollingly engages conductive ring 77, whereby the electrical path extends from one terminal of the DC source to conductive ring 77, conducting roller 90'', contact button 92c'', contact spring 92'', conductive lead 97, contact spring 92', conductive button 92c', conducting roller 90' and the commutator bars 76. It should be understood that both drums 81 and 82 may be provided with keyways for locking drums 81 and 82 to rotor shaft 15 to prevent any rotation of the drums relative to shaft 15. Similar pairs of roller assemblies are provided for conducting DC energy of the opposite polarity from conductive ring 73' to the commutator bars 76.

The arrangement of the contact assembly of FIGS. 6-6a provide operating characteristics which embrace all of the advantages of the commutating structure of FIG. 1 as well as providing enhanced dynamic stability.

The novel DC motor described herein, in contrast to conventional DC motors, permits the use of a rotor assembly having a relatively small mass and a corresponding low moment of inertia. Moreover, the permanent magnet members may be of the ceramic type to further reduce the mass of the rotor assembly. Effecting commutator switching in the stator assembly permits the use of a larger copper volume which significantly reduces the amount of heating occuring in the electrically energized stator assembly, which serves to prolong the useful operating life of the motor. Also, having the windings in the stator eliminates the stress normally experienced by rotor-mounted windings, thereby prolonging the life of the windings and the motor. By the use of the contact assemblies of FIGS. 6-6a the DC machine design embraces all of the aforementioned advantages as well as that of greatly enhancing the dynamic stability of the device.

The invention disclosed and claimed herein is not limited to the specific mechanism and techniques herein shown and described since modifications will undoubtedly occur to those skilled in the art. Hence, departures may be made from the form of the instant invention without departing from the principles thereof.

I claim:

1. Switching apparatus for a machine responsive to a source of DC power and having interacting rotor and stator assemblies which rotate relative to each other wherein one of said assemblies is provided with a winding having a plurality of energizeable coils, said coils having an annular array of commutator bars associated therewith for supplying electrical power thereto, and the other of said assemblies having a plurality of permanent magnets associated therewith, said apparatus comprising:

a. first and second annular conductive rings associated with said assembly having said winding, said conductive rings being adapted respectively for coupling to opposite polarities of said DC source; and b. first and second roller contact means associated with the other of said assemblies:

i. said first roller contact means including first and second electrically connected rollers adapted to independently rotate on their respective axes and independently move radially with respect to said other assembly so as to progressively and sequentially engage said commutator bars and to continuously engage said first conductive ring to momentarily couple said commutator bars to said first conductive ring;

ii. said second roller contact means including third and fourth electrically connected rollers adapted to independently rotate on their respective axes and independently move radially with respect to said other assembly so as to progressively and sequentially engage said commutator bars and to continuously engage said second conductive ring to momentarily couple said commutator bars to said second conductive ring.

2. The apparatus of claim 1 wherein said assembly having said winding comprises a stator and wherein said other assembly comprises a rotor.

3. The apparatus of claim 1 wherein said first and second roller contact means are angularly displaced from one another so as to simultaneously engage commutator bars associated with the same coil.

4. The apparatus according to claim 1 wherein said first and second conductive rings are disposed on opposite sides of said annular array of commutator bars.

5. The apparatus of claim 4 wherein said first and second roller contact means are linearly displaced from one another.

6. The apparatus of claim 1 wherein said commutator bars are skewed so that when said first and second roller contact means engage said commutator bars they effect a make-before-break contact sequence.

* * * * *